United States Patent Office 2,924,588
Patented Feb. 9, 1960

2,924,588

ORGANOSILOXANE ALCOHOLS

John L. Speier, Midland, Mich., assignor to Dow Corning Corporation, Midland, Mich., a corporation of Michigan No Drawing. Application April 22, 1957
Serial No. 654,074

7 Claims. (Cl. 260—46.5)

This invention relates to organosilicon compounds having hydroxylated hydrocarbonyl radicals attached to the silicon.

This application is a continuation-in-part of applicant's copending application Serial No. 463,061, filed October 18, 1954, now abandoned, which was a continuation-in-part of applicant's then copending application Serial No. 398,896, filed December 17, 1953, now abandoned.

The term "organo functional groups" as employed hereinafter refers to an organic group attached to a silicon by a Si—C bond which group also contains a functional organic group substituted therein (i.e., COOH, OH, NH$_2$, CHO, etc.). The term "organo functional silicon compound" refers to an organosilicon compound containing an organo functional group. The term "silicon functional group" as employed herein refers to a hydrolysable or a condensable group attached to the silicon by linkages other than Si—C (i.e., halogen, alkoxy, hydroxy, etc.).

Organosilicon compounds containing organo functional groups which have previously been prepared are generally those containing four nonhydrolyzable groups attached to the silicon. These materials could not be polymerized to siloxanes without cleavage of one of the organic groups. In those cases where some of the organic groups attached to the silicon are methyl and/or phenyl, the previously known organo functional organosilicon compounds could be polymerized to siloxanes by cleavage of a methyl or a phenyl radical by concentrated sulphuric acid followed by hydrolysis of the resulting silyl sulphate. However, the siloxanes so prepared were inherently dimeric materials and were not capable of further siloxane polymerization. As a consequence the organo functional siloxanes heretofore known have been limited in their applicability.

Ever since the advent of organopolysiloxane resins there has been a continued effort to combine them with organic resins such as alkyds. In general, the efforts for such a combination have been directed toward either merely blending an organosilicon resin with an alkyd resin or by reacting an organosilicon compound having a silicon functional group with a polyhydric alcohol and a dibasic acid or with a previously prepared alkyd resin having free hydroxyls. These methods have produced resins which have met with considerable commercial success. Nevertheless these resins suffer from the fact that the siloxanes and the alkyd are combined through Si—O—C linkages which are inherently hydrolytically unstable. As a result the moisture resistance of such resins is not as good as could be desired.

One of the primary objects of this invention is to provide organosiloxanes which can be chemically combined with various types of organic resins without having Si—O—C linkages present in the product. Another object is to provide functional organopolysiloxanes which have greater flexibility of application than has heretofore been possible with such materials. Another object is to provide functional organopolysiloxanes which are commercially feasible. Other objects and advantages will be apparent from the following description.

This invention relates to organosiloxanes of the formula

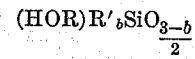

in which R is a divalent saturated aliphatic or cycloaliphatic hydrocarbon radical in which the hydroxyl group is attached to at least the third carbon atom away from the silicon, R' is a monovalent hydrocarbon radical or a halogenated monovalent hydrocarbon radical, free of aliphatic unsaturation and $b$ has a value from 0 to 2 inclusive.

The siloxanes of this invention are prepared by hydrolyzing organofunctional silanes of the formula (YOR)R'$_b$SiX$_{3-b}$ in which R, R' and $b$ are as above defined, Y is an acyl or a trihydrocarbonylsilyl radical and X is bromine, chlorine or hydrogen. The hydrolysis of these silanes is carried out under conditions which will not only remove the X radicals from the silicon but will also hydrolyze the Y group. In those cases in which Y is a tricarbonylsilyl radical the hydrolysis of both groups is carried out by merely adding the organosilicon compound to water, preferably in the presence of a solvent such as toluene, ether and the like. When the Y group is an acyl radical then the conditions must be somewhat more drastic in order to hydrolyze the organoester linkage. This may be done by refluxing the silane with dilute aqueous alkali. The above silanes are best prepared by reacting unsaturated esters of the formula ROY with hydrogen-containing silanes of the formula R'$_b$SIX$_{4-b}$. These silanes should contain at least one hydrogen atom bonded to the silicon. The reaction proceeds by means of the addition of the silane to the unsaturated linkage in the ester and can be represented schematically as follows:

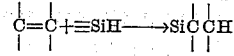

In general the reaction may be carried out at temperatures from 50 to 150° C. and if desired, catalysts such as benzoyl peroxide or t-butylperbenzoate may be employed.

The preferred silane reactants in this process are those in which X is hydrogen or bromine. However, chlorosilanes may also be employed although the yields are not as good.

The unsaturated esters which are employed are those which contain one C=C linkage. These esters may be either esters of an unsaturated alcohol and a saturated organic acid or esters of an unsaturated alcohol and a silanol. For the purposes of this invention the esters employed may be either aliphatic or cycloaliphatic. The cycloaliphatic esters can be either monocyclic or polycyclic. The unsaturated alcohols themselves cannot be employed in the reaction because the active hydrogen reacts with the silane X radicals to give complex products.

Specific examples of esters which are operative herein are allyl acetate, trimethylallyloxysilane, undecenyl acetate, oleyl propionate,

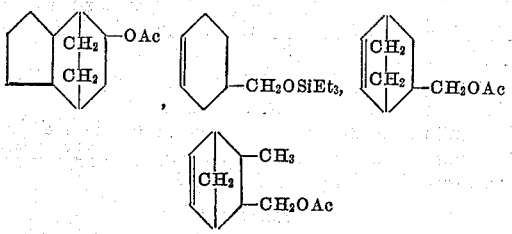

and 4 cyclohexeneol acetate.

The above cyclic esters are best prepared by the well-known Diels-Alder reaction which involves the condensation of a 1,4-conjugated diene with the ester of an unsaturated alcohol.

For the purpose of this invention R may be any divalent saturated aliphatic or cycloaliphatic hydrocarbon radical. The position of the hydroxyl group on the radicals must be such that it is on at least the third carbon from the silicon (i.e., the gamma carbon). The hydroxyl may be at any distance greater than this from the silicon. If the hydroxyl group is on the first or second carbon atom removed from the silicon (i.e., the alpha or beta carbon atom), the compounds are hydrolytically unstable and are not suitable for use in this invention.

Specific examples of R radicals which are within the scope of this invention are any saturated divalent aliphatic hydrocarbon radicals of at least 3 carbon atoms such as propylene, butylene and octadecylene and any saturated cycloaliphatic divalent hydrocarbon radical of at least 4 carbon atoms such as

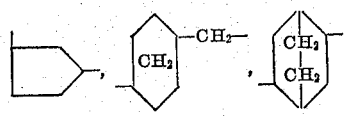

and

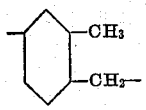

In the siloxanes of this invention R' can be any monovalent hydrocarbon radical free of aliphatic unsaturation such as alkyl radicals such as methyl, ethyl, octadecyl; cycloalkyl radicals such as cyclohexyl and cyclopentyl; and aromatic hydrocarbon radicals such as phenyl, benzyl, tolyl, naphthyl and xenyl. R' can also be any halogenated monovalent hydrocarbon radical free of aliphatic unsaturation such as chlorophenyl, dibromoxenyl, tetrafluoroethyl, pentafluorobutyl and α,α,α-trifluorotolyl.

The organo functional siloxanes of this invention can be copolymerized with any other siloxanes of the formula

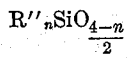

where R'' is any monovalent hydrocarbon or halogenated monovalent hydrocarbon radical and $n$ has an average value from 1 to 3. For example, the corresponding hydrolyzable silanes may be cohydrolyzed in the conventional manner or the functional siloxanes of this invention can be copolymerized with other siloxanes by means of siloxane bond rearrangement. The relative amount of the functional organo siloxanes can be varied to any extent, for example, from .001 to 99.999 mol percent of the copolymer.

The functional organo siloxanes of this invention either alone or when copolymerized with other siloxanes can also be reacted with polyfunctional organic compounds such as dicarboxylic acids or di-isocyanates to give resinous materials. For example, the functional siloxanes of this invention can be reacted with phthalic anhydride and drying oil acids in the conventional manner for preparing alkyd resins. The resulting products are useful for paints and enamels. In addition the siloxanes of this invention can be reacted via the organo functional group with other organo functional siloxanes such as those disclosed and claimed in the applicant's U.S. Patent No. 2,723,987.

The organo functional siloxanes of this invention are useful, per se, as surface active agents.

The following examples are illustrative only and should not be construed as limiting the invention which is properly set forth in the appended claims.

*Example 1*

19.5 g. of allyloxytrimethyl silane, 32 g. of mono- phenyl silane and 2.8 g. of t-butylperbenzoate were heated on a steam bath for one hour. Upon distillation, 3-phenylsilylpropoxytrimethyl silane, B.P. 98–99° C. at 2 mm., was obtained.

When this material is hydrolyzed with dilute sodium hydroxide solution, the siloxane $C_6H_5[HO(CH_2)_3]SiO$ is obtained.

*Example 2*

Example 1 was repeated using monoamyl silane. The resulting product was 3-amylsilylpropoxytrimethyl silane,

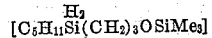

When this material was hydrolyzed, the siloxane having the unit formula $[(C_5H_{11})HO(CH_2)_3SiO]_x$ was obtained.

*Example 3*

43 g. monophenyl silane, 20 g. of allyl acetate and 2.8 g. of t-butylperbenzoate were heated on a steam bath for 4 hours at about 90° C. Upon distillation of the reaction mixture a 72% yield of 3-phenylsilylpropyl acetate was obtained. This material boils at 155 to 156° C. at 2.5 mm.

A solution of 40 g. of 3-phenylsilylpropyl acetate in 75 ml. of ether was added slowly to a solution of 25 ml. of ethanol which contained 4 g. of water and a catalytic amount of piperidine and sodium hydroxide. During the addition the temperature was maintained below 35° C. and evolution of gas was noted. After 1 hour the addition was complete and the mixture stood at room temperature for 15 hours. The organic layer was washed several times with very dilute acid until neutral and the resulting organic liquid was dried over sodium sulphate. Upon evaporation of the solvent a viscous liquid siloxane polymer was obtained having a refractive index at 25° C. of 1.5282 and a density at 25° C. of 1.160. This siloxane had the unit structural formula

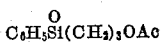

The yield of the siloxane was quantitative.

*Example 4*

40 g. of the silane acetate of Example 3 was added slowly with stirring to a solution of 4 g. of water, 25 ml. of ethanol and 50 ml. of ether, said solution containing a catalytic quantity of sodium hydroxide. Gas evolution occurred immediately and the temperature was maintained below 35° C. After standing overnight a solution of 8.5 g. of sodium hydroxide in 25 ml. of ethanol and 25 ml. of water was added slowly and the resulting mixture was heated and stirred at 50 to 55° C. for 3 hours. Upon cooling 18.9 g. of sodium acetate trihydrate crystals formed. The liquid product was mixed with 50 ml. benzene and made neutral with dilute acid. The organic layer was washed several times with water and the resulting material stripped of solvents. The resulting product was a viscous polymeric siloxane having the unit formula

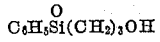

which was obtained in quantitative yield.

*Example 5*

6 g. of the siloxane

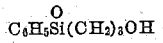

8.3 g. of the siloxane

(prepared in accordance with U.S. Patent No. 2,723,987) and 10 g. of 12-hydroxystearic acid were combined and heated at 250° C. in a $CO_2$ atmosphere for 6 hours. The resulting polymer was tough, somewhat elastic material which resembled natural rubber. It adhered strongly to glass.

Example 6

121.6 parts by weight of soya oil fatty acids, 38.1 parts by weight pentaerythritol, 52 parts by weight phthalic anhydride and 13.5 parts by weight of the siloxane

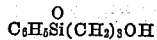
$$C_6H_5Si(CH_2)_3OH$$

were all dissolved in 200 parts by volume of xylene and heated with stirring at 148° C. for 5 hours. The xylene was then stripped off at a temperature of 225° C. over a period of 15 hours. 100 parts by volume of xylene was then added and heating was continued at 150° C. for 4 hours. A total of 13 parts by weight water was removed. The solution was concentrated in a $CO_2$ atmosphere to remove xylene. The resulting resin amounted to 204 parts by weight and had an acid number of 12.3 and 12.9.

This resin was diluted to 70% solids with Stoddard solvent and yielded a solution of a Gardner-Holt viscosity Z-1 and a Gardner color of 9.

71.5 parts by weight of this resin solution was mixed with .27 part by volume of 6% cobalt-naphthenate and .35 part by volume of 25% lead naphthenate driers. The resulting varnish had an air-drying time of 1 hour and 40 minutes for a 3 mil film. After drying for 72 hours the Sward hardness was 14.

This resin film showed a greatly improved thermal stability over a comparable alkyd formulation containing none of the siloxane and had an extremely high alkali resistance when compared with standard alkali-resistant alkyd formulations. The film did not water spot which is a decided improvement over previously known silicone-alkyd resins.

A paint made by mixing 50 parts by weight of the above resin with 56 parts by weight $TiO_2$ was found to adhere strongly to iron, copper, brass and wood.

Example 7

21.2 g. of undecenyl acetate and 1 g. of t-butylperbenzoate were added slowly to 27 g. of monophenyl silane. During the addition, the reaction mixture was maintained at 90–95° C. and heating was continued for 19 hours. The volatiles were removed under vacuum and the residue was the product $C_6H_5SiH_2(CH_2)_{11}OOCCH_3$. This material had a specific refraction of .3092.

10 g. of this silane acetate was saponified and hydrolyzed by refluxing with dilute sodium hydroxide solution for several hours. The reaction mixture was washed free of sodium acetate and after evaporation of the volatiles a viscous fluid having the unit formula

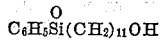
$$C_6H_5Si(CH_2)_{11}OH$$

was obtained.

Example 8

150 g. of allyl acetate, 3.9 g. of t-butylperbenzoate were added slowly with stirring to 556 g. of tribromosilane which had been heated to 105° C. The rate of addition of the allyl acetate solution was such that the temperature was maintained at 110–120° C. This required 1 hour and 45 minutes. The mixture was allowed to cool for 1 hour, then the excess tribromo silane was distilled off. The residue was distilled to give $$Br_3SiCH_2CH_2CH_2OOCCH_3$$

B.P. 109–110° C. at 4 mm.

When this silane was hydrolyzed at a temperature below 35° C. a siloxane  $O_{1.5}SiCH_2CH_2CH_2OOCCH_3$ was obtained.

When this siloxane is refluxed with an aqueous ethanol solution containing a catalytic amount of NaOH for 15 hours and thereafter acidified, the siloxane alcohol $O_{1.5}Si(CH_2)_3OH$ is obtained.

Example 9

Trichlorosilane was reacted with allyl acetate in the manner of Example 8. The compound $$Cl_3SiCH_2CH_2CH_2OOCCH_3$$

B.P. 90–95° C. at 15 mm., was obtained in lower yield.

Example 10

When 1 mol of methyldibromosilane is reacted with 1 mol of allyloxytrimethylsilane in the manner of Example 1 the compound

$$MeSi(CH_2)_3OSiMe_3$$ with $Br_2$ is obtained.

When this silane is hydrolyzed by adding it to a mixture of water and toluene the siloxane having the unit formula

$$MeSi(CH_2)_3OH$$

is obtained.

Example 11

Chlorophenylsilane, $ClC_6H_4SiH_3$ is obtained by reducing chlorophenyltrichlorosilane with lithium aluminum hydride.

When 1 mol of chlorophenylsilane is reacted with 1 mol of allyloxytrimethylsilane in accordance with the procedure of Example 1 the compound

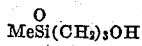
$$ClC_6H_4Si(CH_2)_3OSiMe_3$$ with $H_2$ is obtained. When this material is hydrolyzed by adding it to a mixture of water and toluene the siloxane having the unit formula

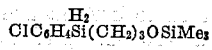
$$ClC_6H_4Si(CH_2)_3OH$$

is obtained.

Example 12

When an equal molar mixture of $Br_3Si(CH_2)_3OSiMe_3$ and phenylmethyldichlorosilane and phenylvinyldichlorosilane is cohydrolyzed by adding it to a mixture of toluene and water and the resulting solution is washed free of acid and heated at 100° C. for 12 hours a copolymeric siloxane having the structural units $HO(CH_2)_3SiO_{1.5}$, $C_6H_5(Me)SiO$, $C_6H_5(C_2H_3)SiO$ and $Me_3SiO_{.5}$ is obtained.

Example 13

64.8 g. of monophenylsilane was heated to 80 to 90° C. under $N_2$ as a mixture of 57.9 g. of

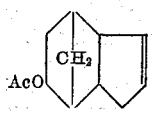

and 4 g. of t-butylperbenzoate was added over a period of 5 hours. After addition was complete the mixture was heated at 110° C. for 1 hour. After distillation a residue of

boiling above 175° C. at 5 mm. was obtained in 78.5% yield. This compound had the following properties, $d_4^{25}$ 1.076, $n_D^{25}$ 1.5395, sp. ref. .2914.

This silane was heated with a solution of KOH in methanol. There was an evolution of gas and methylacetate distilled. The resulting product was hydrolyzed with water and a catalytic amount of HCl to give the siloxane having the unit formula

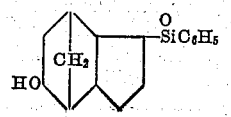

Example 14

Equimolar amounts of trichlorosilane and the compound

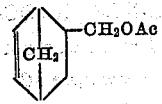

were heated in the presence of t-butylperbenzoate in accordance with the method of Example 13. Upon distillation of the resulting product the compound

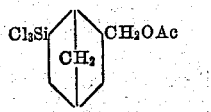

was obtained.

30.2 g. of this chlorosilane was added slowly with stirring to a solution of 23.5 g. potassium hydroxide in 100 ml. of water. The solution was cooled during the addition of the chlorosilane. After addition was complete the mixture was heated 1 hour at 100°C. A solid precipitate had formed so 100 ml. of ethanol were added at 50° C. Complete solution occurred. The solution was then refluxed for 2 hours whereupon potassium acetate and potassium chloride precipitated. The solution was filtered and ether was added to the filtrate. The water layer separated and was discarded and the organic layer was evaporated to dryness and the residue dried for several hours at 110° C. The resulting product was the siloxane alcohol having the formula

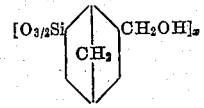

The silicon content was found to be 15.45%.

Example 15

A mixture of 105 g. of phenylmethyldichlorosilane, 31.6 g. phenyltrichlorosilane, 22.3 g. of methyltrichlorosilane and 45.2 g. of

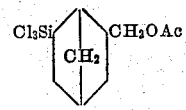

were cohydrolyzed in the presence of toluene and ether. The resulting resin was then refluxed in a mixture of 100 ml. toluene, 50 ml. ethanol and 10 g. of potassium hydroxide for 3 hours at 81° C. The resulting product was a siloxane copolymer resin composed of 55 mol percent phenylmethylsiloxane, 15 mol percent monophenylsiloxane, 15 mol percent monomethylsiloxane and 15 mol percent

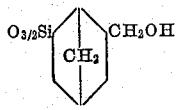

A 70% toluene solution of this resin was mixed with an equivalent amount of m-toluene diisocyanate. Sheet iron panels were coated with this solution and cured 30 minutes at 120° C. The films obtained were light in color, glossy and flexible and were unaffected by hydrogen chloride and by saturated sodium chloride solution when heated in the latter 3 hours at 95° C.

Equivalent results were obtained when the resin was reacted with p,p'-diisocyanatodiphenylmethane.

Example 16

1,000 g. of allyl acetate were mixed with 4 g. of 1% by weight platinum-on-charcoal and heated to reflux. 1041 g. of dimethylmonochlorosilane were added at a rate to keep the mixture boiling from the heat of reaction. The addition required about 5.5 hours. The product was filtered and distilled. Volatiles were stripped off. 1675 g. of dimethylchlorosilylpropyl acetate were obtained, a yield of 86%.

487 g. of the above product were hydrolyzed with crushed ice. After being washed free of HCl, the hydrolyzate was dried azeotropically with benzene and distilled to produce 386 g., a yield of 91%, of

with $n_D^{25}$ 1.4320.

The above disiloxane ester was dissolved in benzene and ethanol containing a 10% by weight excess of potassium hydroxide and refluxed for 1.5 hours. After acidification with hydrochloric acid, the insoluble inorganic salts were removed by filtration, and the filtrate was washed to remove HCl and residual salts. The alcohol was stripped off, the hydrolyzate was dried azeotropically, and the benzene was removed at reduced pressure. The solvent-free product had the following properties: $n_D^{25}$ 1.4472 $d_4^{25}$ 0.9531, $R_D$ (found) 0.2804 and $R_D$ (calc.) 0.2817. The product had the formula

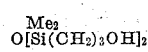

That which is claimed is:

1. A siloxane having the unit formula $$(HOR)R'_b SiO_{\frac{3-b}{2}}$$

in which each R is selected from the group consisting of divalent saturated aliphatic and cycloaliphatic hydrocarbon radicals, in which the hydroxyl group is attached to at least the third carbon atom away from the silicon, each R' is selected from the group consisting of monovalent hydrocarbon radicals and halogenated monovalent hydrocarbon radicals, said radicals being free of aliphatic unsaturation and b has an average value of from 0 to 2 inclusive.

2. A siloxane having the formula

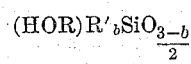

3. A siloxane having the unit formula $$(HOR)R'_b SiO_{\frac{3-b}{2}}$$

in which R is selected from the group consisting of divalent saturated aliphatic and cycloaliphatic hydrocarbon radicals, in which the hydroxyl group is attached to at least the third carbon atom away from the silicon, R' is selected from the group consisting of monovalent hydrocarbon radicals and halogenated monovalent hydrocarbon radicals, said radicals being free of aliphatic unsaturation and b has a value from 0 to 1 inclusive.

4. A siloxane having the unit formula $$(C_6H_5)_b HO(CH_2)_3 SiO_{\frac{3-b}{2}}$$

where b has a value from 0 to 1 inclusive.

5. A siloxane having the unit formula

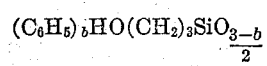

6. A copolymeric siloxane composed of siloxane units of the formula $$(HOR)R'_b SiO_{\frac{3-b}{2}}$$

in which each R is selected from the group consisting of divalent saturated aliphatic and cycloaliphatic hydrocarbon radicals, in which the hydroxyl group is attached to at least the third carbon atom away from the silicon, each R' is selected from the group consisting of monovalent hydrocarbon radicals and halogenated monovalent hydrocarbon radicals, said radicals being free of aliphatic unsaturation and $b$ has an average value of from 0 to 2 inclusive, and siloxane units of the formula $$R''_n SiO_{\frac{4-n}{2}}$$

where each $R''$ is selected from the group consisting of monovalent hydrocarbon and halogenated monovalent hydrocarbon radicals and $n$ has an average value of from 1 to 3 inclusive.

7. A copolymeric siloxane composed of siloxane units of the formula $$(HOR)R'_b SiO_{\frac{3-b}{2}}$$

in which R is selected from the group consisting of divalent saturated aliphatic and cycloaliphatic hydrocarbon radicals, in which the hydroxyl group is attached to at least the third carbon atom away from the silicon, $R'$ is selected from the group consisting of monovalent hydrocarbon radicals and halogenated monovalent hydrocarbon radicals, said radicals being free of aliphatic unsaturation and $b$ has a value from 0 to 1 inclusive, and siloxane units of the formula $$R''_n SiO_{\frac{4-n}{2}}$$

where $R''$ is selected from the group consisting of monovalent hydrocarbon and halogenated monovalent hydrocarbon radicals and $n$ has an average value of from 1 to 3 inclusive.

References Cited in the file of this patent

UNITED STATES PATENTS

| | | |
|---|---|---|
| 2,443,898 | Ellingboe | June 22, 1948 |
| 2,527,590 | Speier | Oct. 31, 1950 |
| 2,629,727 | Speier | Feb. 24, 1953 |

OTHER REFERENCES

Speier: J. American Chem. Soc., vol. 74, No. 4, Feb. 20, 1952, pages 1003–1010.

UNITED STATES PATENT OFFICE

Certificate of Correction

Patent No. 2,924,588 February 9, 1960

John L. Speier

It is hereby certified that error appears in the printed specification of the above numbered patent requiring correction and that the said Letters Patent should read as corrected below.

Column 2, lines 62 to 66, for that portion of the formula reading

Signed and sealed this 2nd day of August 1960.

[SEAL]

Attest:
KARL H. AXLINE,
*Attesting Officer,*

ROBERT C. WATSON,
*Commissioner of Patents,*